UNITED STATES PATENT OFFICE.

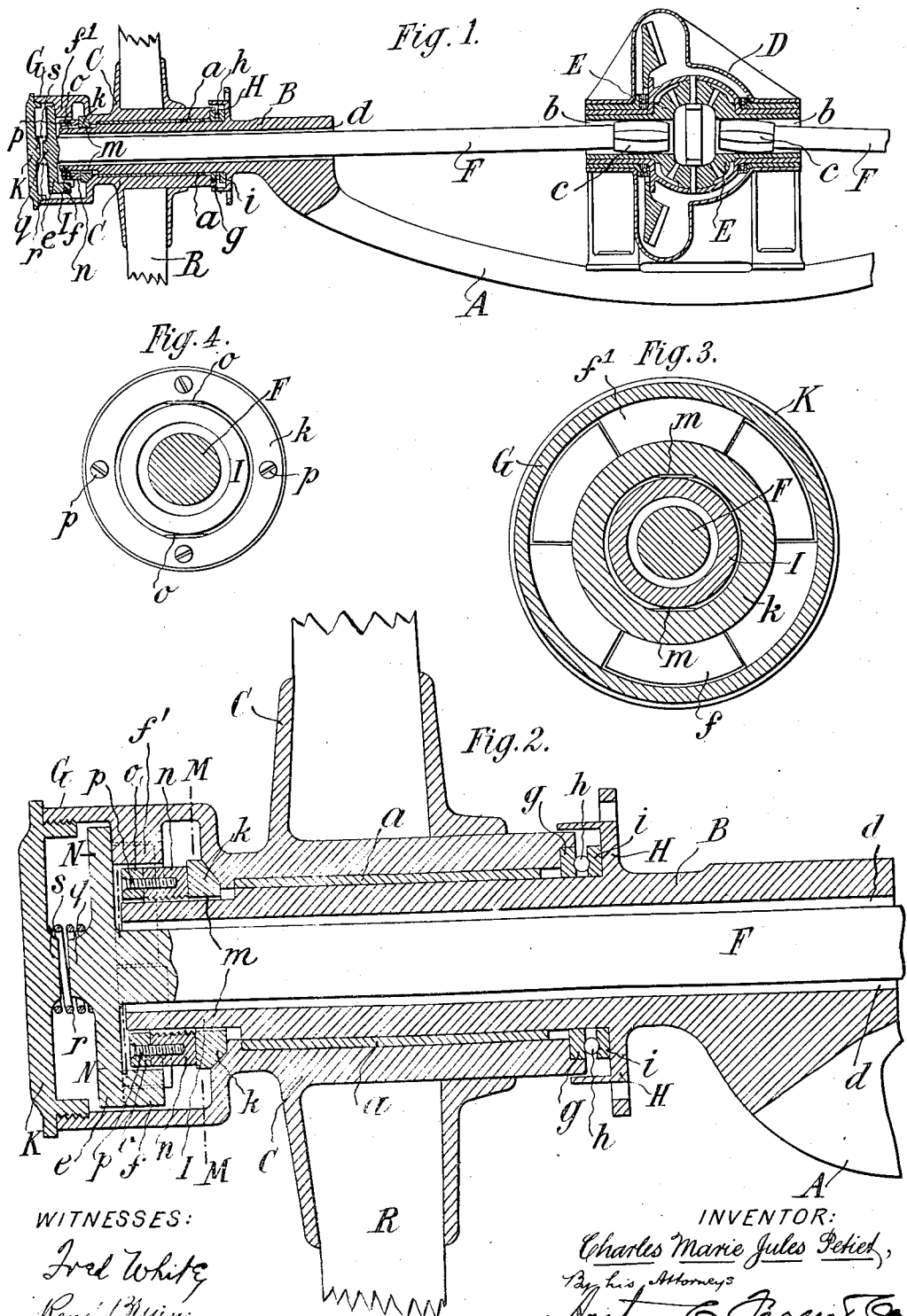

CHARLES MARIE JULES PETIET, OF VILLENEUVE-LA-GARENNE, FRANCE, ASSIGNOR TO SOCIÉTÉ ANONYME DES AUTOMOBILES ARIÉS, OF VILLENEUVE-LA-GARENNE, FRANCE.

MOTOR-VEHICLE.

No. 816,250.      Specification of Letters Patent.      Patented March 27, 1906.

Application filed January 10, 1905. Serial No. 240,490.

*To all whom it may concern:*

Be it known that I, CHARLES MARIE JULES PETIET, a citizen of the Republic of France, residing at Villeneuve-la-Garenne, Seine, France, have invented Improvements in Means for Supporting and Driving the Wheels of Motor Road-Vehicles, of which the following is a specification.

This invention has for its main object to provide an improved member, which for convenience I will call an "axle," for supporting the driving-wheel shaft and driving-wheels of motor road-vehicles. This axle is preferably of wrought-steel and is made in one piece and of any desired form in cross-section. Its journals receive the inclination which is suitable, according to the inclination to be given to the wheels. The accompanying drawings show a typical form of the said axle-carrier and illustrate the manner in which the wheels turn on the bearings thereof and how they are driven by the transmission-shafts or driving-axles.

Figure 1 is a part vertical section of the axle-carrier and mechanism for transmitting the motion to the wheels, only one of which is shown. Fig. 2 is a longitudinal section, on a larger scale, through one of the bearings. Fig. 3 is a section on M M of Fig. 2, and Fig. 4 is a section on N N of Fig. 2.

The axle A, made in one piece of wrought-steel of any desired section, carries the journals B, which have a certain inclination to give inclination to the wheels. The hub C of each wheel is mounted with slight friction on the journals B, a bronze sleeve $a$ being preferably fitted between the hub and the journal. If desired, ball-bearings may be interposed between the hubs of the wheels and their journals. In either case the wheels are themselves carried by the axle and run loosely on these journals.

An ordinary or suitable differential gear D, driven by the motor through any suitable flexible transmission, is fixed on the middle of the axle A. The axles of the two driving-pinions E have squared holes $b$, in which fit with slight friction the ends $c$ of two rigid shafts F, these ends being likewise squared, but being slightly olive-shaped. These two shafts, connected as explained to the driving-pinions of the differential gear, transmit the motion to the wheels R through their hubs C.

The internal diameter of the holes $d$ in the journals of the axle A is sufficient to allow of the parts E of the driving-shaft to be introduced through the outer ends of the journals and their extremities to be inserted into the squared hole $b$ in the hub of the corresponding pinion. At its other end the driving-shaft F carries a disk or plate $e$, provided peripherally with teeth in the form of segments $f$, adapted to engage in gaps of the same shape between the teeth $f'$, formed with or united to a box G, forming a prolongation of the hub C of the wheel. In this way the rotation of the shaft F is transmitted to the hub of the wheel in an absolutely certain manner.

The wheel is held on its journal as shown in detail in Figs. 2 and 4. On the side toward the center the hub of the wheel carries a washer or collar $g$, which bears against another collar $i$, which in turn bears against a flange or face H of the axle, a ball-bearing $h$ being fitted between $g$ and $i$. At the outer side a metal ring $k$ is provided, this having a conical face to bear against a correspondingly-shaped portion of the hub. This ring $k$ is cut or shaped so as to present two flats or bearing-faces $m$, corresponding to two flats or bearing-faces formed at the ends of a diameter of the threaded end I of the journal of the axle, as seen in Fig. 4. In this way the ring $k$ is prevented from turning on the journal. A nut $n$ is screwed on the end of the journal and bears against the rear face of the ring $k$. Another ring $o$ with a flat or bearing face is fitted behind the nut, and screws $p$ are passed through the ring $o$ and into the nut $n$ and prevent the said nut from becoming unscrewed. The wheel being thus properly mounted on the journal, the shaft F is passed through the hole in the journal, care being taken that the segments $f$ of the plate or disk pass into the gaps between the teeth $f'$ in the box of the hub, as before explained.

It will be observed that the disk $e$ of the axle has a projection or nipple $q$ on its outer face, around which is fitted a coiled spring $r$.

K is a cap screwed into the box G to close the same and likewise provided centrally with a nipple $s$, over which the spring $r$ fits. The end of the shaft F has thus a resilient bearing against the cap of the journal.

What I claim is—

The combination of an axle A made in a single piece, a differential gearing fixed on said axle, transmission-shafts F connected to the driving-pinions of the differential by means of olive-shaped squared heads engaging in squared holes in the hubs of said pinions, the hubs of the wheels being journaled on the ends of the axles, rings arranged non-rotatively on the ends of the axles retaining said hubs in place, a box forming a prolongation of the hub of each wheel and provided with gaps, teeth on the ends of the transmission-shafts engaging in said gaps to transmit the rotation of the shaft to the wheel, a screw-cap closing the end of each of said boxes, and a spring interposed between the end of each shaft and said gap to form a resilient bearing or abutment.

In witness whereof I have hereunto signed my name in the presence of two subscribing witnesses.

CHARLES MARIE JULES PETIET.

Witnesses:
 JULES ARMENGAUD, Jeune,
 JOHN BAKER.